United States Patent [19]

Clark, IV

[11] Patent Number: 5,074,250

[45] Date of Patent: Dec. 24, 1991

[54] ANIMAL-OPERATED WATERING DEVICE

[76] Inventor: Reuben B. Clark, IV, 280 Winthrop Rd., Berwyn, Pa. 19312

[21] Appl. No.: 487,722

[22] Filed: Mar. 2, 1990

[51] Int. Cl.5 ............................................... A01K 7/00
[52] U.S. Cl. ................................................. 119/72.5
[58] Field of Search ................. 119/72, 72.5; 137/333, 137/339

[56] References Cited

U.S. PATENT DOCUMENTS

| | | | |
|---|---|---|---|
| 1,454,284 | 5/1923 | Holmes | 222/445 |
| 2,710,594 | 6/1955 | Thompson | 119/72.5 |
| 2,851,007 | 9/1958 | Kagan | 119/72.5 |
| 3,476,088 | 11/1969 | Smith | 119/72.5 |
| 3,602,197 | 8/1971 | Fioretto | 119/72.5 |
| 3,756,199 | 9/1973 | Clark, IV | 119/72.5 |
| 4,185,590 | 1/1980 | Hostetler | 119/81 |
| 4,221,188 | 9/1980 | Hostetler | 119/72 |
| 4,284,036 | 8/1981 | Hostetler | 119/72.5 |
| 4,402,343 | 9/1983 | Thompson | 137/614.2 |
| 4,491,088 | 1/1985 | Hostetler | 119/72.5 |
| 4,524,724 | 6/1985 | Steudler, Jr. | 119/72.5 |
| 4,589,373 | 5/1986 | Hostetler et al. | 119/72.5 |
| 4,606,301 | 8/1986 | Steudler, Jr. | 119/72.5 |
| 4,610,221 | 9/1986 | Steudler, Jr. | 119/72.5 |
| 4,637,345 | 1/1987 | Hostetler | 119/72.5 |
| 4,790,264 | 12/1988 | Lack et al. | 119/72.5 |

Primary Examiner—Gene Mancene
Assistant Examiner—R. Thomas Price

[57] ABSTRACT

An animal-operated watering device includes a valve body having a passageway through the body with an inlet and an outlet with a moveable valve operating member having a head portion resting on a collar portion of the valve body and extending substantially the length of a first passage portion in the valve body, with the moveable valve member further including a stem extending through a second passage and projecting beyond the outlet end of the valve body where a spacer lies on the valve element and extends upwardly a portion of the passageway between the valve element and the inlet, where the valve element includes a portion contacting the valve seat which is sufficiently elastomeric to flow along the seat to effectuate a substantially water-tight seal at the seat responsively to an urging member bearing on the valve element.

28 Claims, 4 Drawing Sheets

ANIMAL-OPERATED WATERING DEVICE

FIELD OF THE INVENTION

This invention relates to animal-operated watering devices, specifically poultry-operated watering devices.

DESCRIPTION OF THE PRIOR ART

U.S. Pat. No. 3,756,199 discloses an animal-operated watering device of the general type to which this invention relates.

SUMMARY OF THE INVENTION

This invention is for an animal operated watering device, specifically a poultry watering valve, which includes a valve body having a passage through the valve body with the passage including an inlet and an outlet end. The valve body is adapted to be secured to a hollow water supply member with the inlet end of the passageway communicating with the interior of the water supply member and with the passageway of the watering valve extending vertically. A transverse annular valve seat is located at an intermediate location within the valve body, facing towards the inlet end. The portion of the valve body between the valve seat and the passageway outlet end is divided into first and second portions by a transverse annular collar.

In the preferred embodiment of the invention, the valve operating member has a head portion resting on the collar which extends longitudinally substantially the length of the first portion of a part of the passageway downstream of the valve seat. In the preferred embodiment, the valve operating member further includes a stem portion extending through the second portion of a part of the passageway which is downstream of the valve seat and projects beyond the outlet end of the passageway. The axial dimension of the head portion of the valve operating member does not exceed axial length of the first passage portion. Transverse dimension of the head portion is smaller than that of the first passage portion so that there is an annular space between the valve operating member and the surrounding wall of the passageway, specifically the first portion of the downstream part of the passageway, through which water can flow when the head portion of the valve operating member is displaced from the collar.

The outer diameter of the stem portion of the valve operating member is sufficiently less than inner diameter of the collar so that when the stem portion of the valve operating member is displaced at an angle to the vertical, by action of an animal for example, the head portion of the valve operating member tilts so that an edge of the head portion rises above the valve seat and engages a valve member, thereby opening the valve for flow of water therethrough.

The valve further includes a freely movable valve element, preferably in the form of a thin, flat disk of elastomeric material, located in the passageway through the valve body, adjacent to the valve seat. The valve element extends completely across the opening in the passageway defined by the valve seat.

The valve further preferably includes a cylindrical spacer member lying on the valve element and extending upwardly in the portion of the passageway between the valve element and the passageway inlet end. The cylindrical element is preferably of diameter less than that of the freely movable valve element. The surface of the cylindrical member which contacts the valve element is sufficiently porous so that the valve element does not stick to the surface of the cylindrical member but rather slides along the surface of the cylindrical member when the valve operating member head tilts and lifts one side of the valve operating member off of the valve seat.

A portion of the passageway through the valve body which is proximate to the inlet end of the passageway preferably defines a tubular restriction passageway portion. The inlet end of the passageway is axially aligned with the opening defined by the valve seat.

Preferably, the exterior surface of the valve body surrounding the inlet end of the passageway is generally transverse to the passageway.

A movable member is preferably located at the portion of the passageway between the cylindrical member and the inlet end. This movable member has a head which contacts the surface of the cylindrical member opposite the surface of the cylindrical member which contacts the valve element. This movable member further includes a stem projecting through the restriction passageway and the inlet end of the passageway, there being clearance between the stem of this movable member and the tubular restriction passageway.

A free-floating washer preferably surrounds the stem portion of the movable member exterior of the passageway and is preferably generally flush with the exterior portion of the body means surrounding the inlet end. The free-floating washer is sized so that there is a very small clearance between the stem of the upper movable member and the inner surface of the washer.

Preferably, the valve element is in the form of a flat disk of elastomeric material, preferably silicone rubber, further preferably of 40 durometer. Additionally, the cylindrical member is preferably brass and fabricated so that the surface of the cylindrical member which contacts the valve element is prepared by tumbling the cylindrical member to break corners, in the conventional, machining fashion, and thereafter sandblasting the surface with aluminum oxide.

In alternate embodiments, the spacer is preferably of a diameter less than that of the freely-movable valve element so as to leave the edges of the freely-movable valve element in a free-floating disposition respecting the annular seat against which the valve element fits. A number of configurations of the valve element are possible, all of which share in common the property of having free-floating, easily movable structure at the valve element periphery.

DESCRIPTION OF THE PREFERRED EMBODIMENTS AND BEST MODE KNOWN FOR PRACTICING THE INVENTION

Referring to FIGS. 1, 2, 3, 7 and 8, the preferred embodiment of the invention is shown and includes a valve body designated generally 10, having a passageway therethrough designated generally 12. The passageway has an inlet end 14 and an outlet end 16; valve body 10 is adapted to be connected to a hollow water supply member, designated generally 34, with inlet end 14 communicating with the interior of the water supply member 34 and with passageway 12 oriented generally vertically.

Figure 1:
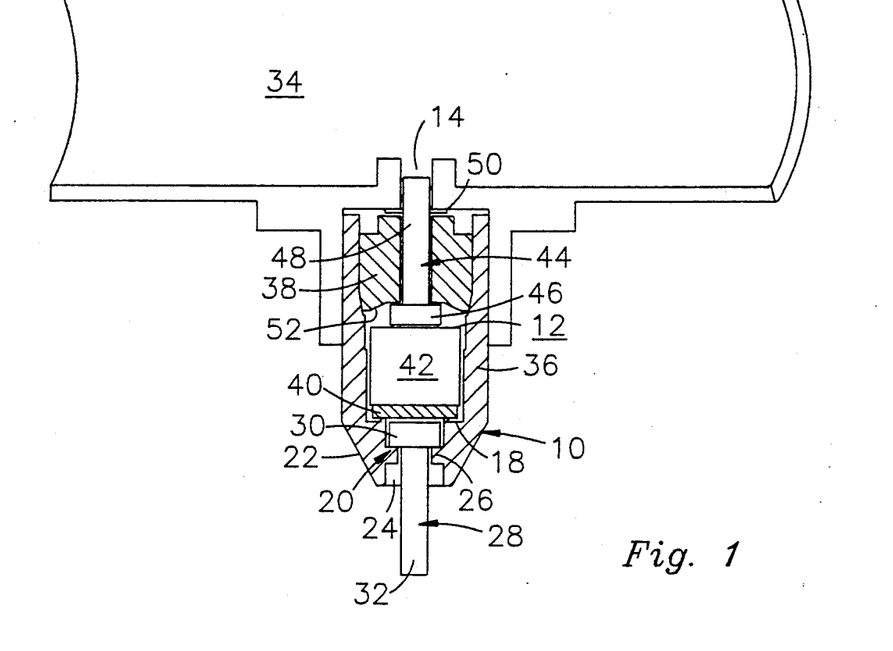
FIG. 1 is a side elevation view of the preferred embodiment of the animal watering device of the invention, shown partly in section.
Figure 3:
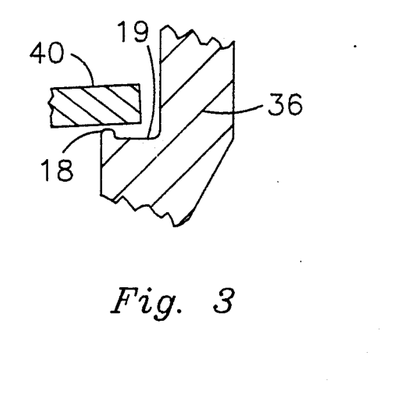
FIG. 3 is an enlarged sectional view of the portion of the device illustrated in FIG. 2 within circle "X".
Figure 8:
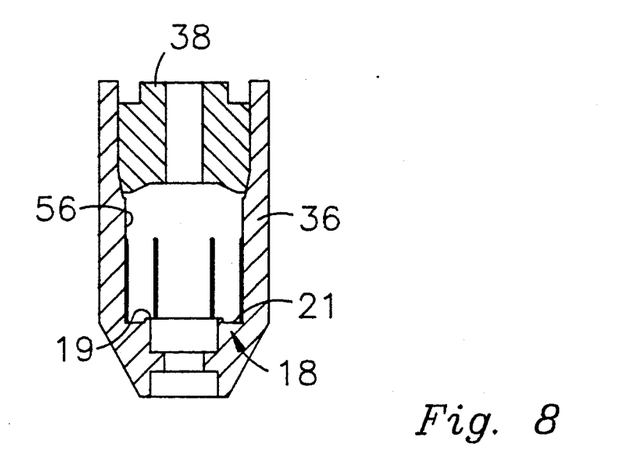
FIG. 8 is a side elevation in section, of the fixed parts of the device shown in FIG. 1.

Valve body 10 has an annular valve seat 18 which is generally transversely oriented respecting passageway 12 and faces towards inlet end 14 as illustrated in FIGS. 1, 3 and 8. Annular valve seat 18 is defined by an annular nipple extending concentrically around the interior of passageway 12, preferably molded in place when valve body 10 is constructed, preferably by injection molding. Between the annular nipple, designated 19 in FIG. 8 and the annular interior surface of the valve body, there is a annular recess or relief, designated 21 in FIG. 8.

Valve body 10 preferably is of two-piece construction, as illustrated generally in FIGS. 1 and 8, with body 10 including a major, outer portion 36 and an inner portion 38 which is snapped in place thereabout in a manner known in the plastics injection molding and fabrication art.

Valve body 10, specifically the outer surface of outer portion 36, is equipped with a bayonet connection for snap-in fitting with water supply member 34. The bayonet connection is conventional, widely used in the industry and forms no part of the invention for which a patent is sought.

The portion of passageway 12 downstream of the valve seat 18 is referred to as part 20 of passageway 12 and includes a first portion 22 and a second portion 24. Portions 22 and 24 are separated one from another by a collar 26.

Figure 2:
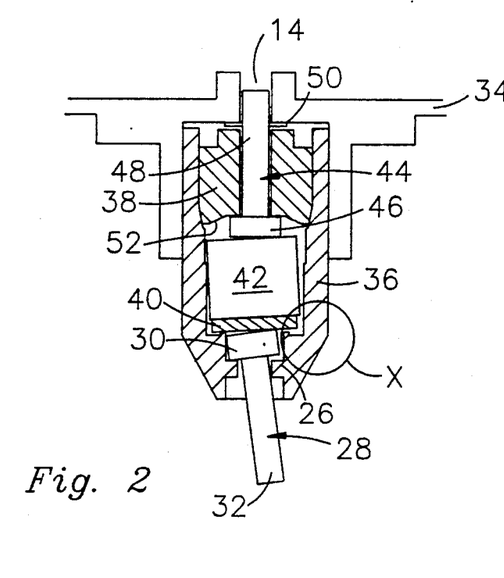
FIG. 2 is a view similar to that of FIG. 1, but showing the valve open.

A valve operating member designated generally 28 has a head portion 30 and a stem portion 32 with head portion 30 residing generally in first portion 22 of downstream part 20 and with stem portion 32 extending through collar 26, along the length of second portion 24 of part 20 of passageway 12 and outwardly of outlet end 16, as shown in FIGS. 1 and 2. Animals may actuate the valve of the invention by contacting stem 32, to displace stem 32 from the vertical orientation thereby causing head 30 to tilt and to contact valve element designated generally 40 in FIG. 1, as shown in FIG. 2.

A preferably cylindrically-shaped spacer 42 rests generally on valve element 40 as shown in FIGS. 1 and 2 and in the preferred embodiment of the invention is brass. Spacer 42 is preferably cylindrical and for best operation of the invention, to minimize the likelihood of a leaking valve, should be of diameter greater than that of cylindrical valve element 40, so as to overly the area in which valve element 40 contacts annular seat 18. Cylindrical spacer 42 lies essentially flush on valve element 40.

It is highly desirable that the surface of cylindrical spacer 42 which facingly contacts the valve element 40 be sufficiently porous so as to permit sliding movement of valve element 40 with respect to spacer 42 when the animal watering device of the invention is opened by an animal displacing valve operating member 28 from the vertical, as shown generally in FIG. 2 of the drawings.

Figure 7:
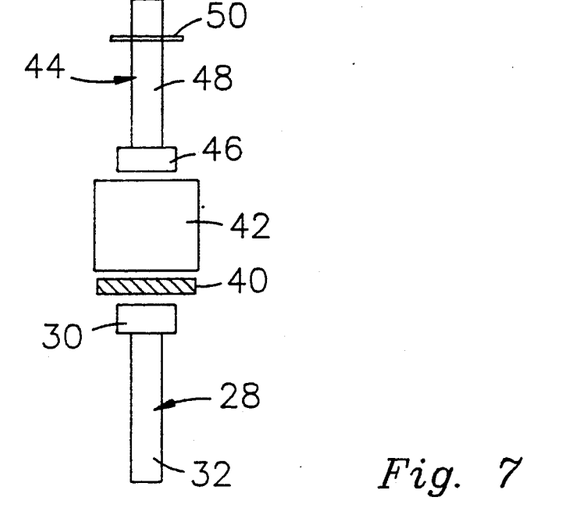
FIG. 7 is a side elevation of the movable parts of the device shown in FIG. 1.

Positioned above spacer 42 is an upper movable member designated generally 44 in FIGS. 1, 2 and 7. Upper movable member 44 has a head portion 46 and a stem portion 48. Upper movable member 44 is preferably stainless steel. Head 46 preferably facingly contacts the upwardly facing surface, unnumbered, of cylindrical spacer 42. Stem 48 of upper movable member 44 extends through an upper portion of passageway 12 formed in inner portion 38 of valve body 10. This upper portion of passageway 12 fits relatively closely about stem portion 48 of upper movable member 44 so as to act as a flow restrictor for water flowing into the valve from water supply member 34 through inlet end 14 of passageway 12.

The exterior surface of valve body 10 around the inlet end 14 of passageway 12, particularly the portion of valve body exterior surface around inlet end 14 formed on portion 38 of valve body 10, is generally transverse to passageway 12 as illustrated in FIGS. 1, 2, 7 and 8.

A free-floating washer is designated generally 50 in FIGS. 1, 2, 7 and 8. Free-floating washer 50, fitting loosely about stem portion 48 of upper movable member 44, is effective to control water flow rate into the valve. This free-floating design, together with the location of washer 50 being at the valve upper end, away from the pecking action of fowl which contact valve actuating member 28 to obtain a drink of water, contributes to long life of the valve. Additionally, having free-floating washer 50 at the upper end of the valve, remote from the living area of the fowl, minimizes and effectively eliminates the possibility of contamination from the poultry fouling the washer and thereby rendering it inoperative. In the preferred embodiment of the invention, the free-floating washer 50 is a stainless steel stamping having an inner diameter of 0.128˙ inches (nominal) plus or minus 0.0005 inches. The outer diameter of stem portion 48 of upper member 44 is 0.125 inches plus or minus 0.001 inches. The inner diameter of passageway 12, in the region where passageway 12 passes through inner portion 38 of valve body 10, is 0.131 inches. This combination of dimensions is effective to control the rate of water flow from water supply member 44 into the animal watering device of the invention. Holding these dimensional tolerances is important because a dimensional variation of from 0.001 to 0.002 inches can make the difference between a valve operating successfully or failing by leaking.

Upper member 44 serves as a flow restrictor to the water; upper member 44 does not open and close but only meters water flow. Water flow into valve inlet end 14 is essentially the same regardless of the position of cylindrical spacer 42, with the exception that if cylindrical spacer 42 pushes upper member 44 sufficiently far upwardly that head portion 46 of upper member 44 seats against the lower surface of inner portion 38 of valve body 10, flow is essentially stopped. As a practical matter, this rarely happens because of the manner in which fowl peck at valve operating member 28. The tendency of such fowl is to displace valve operating member 28 from the vertical, as illustrated in FIG. 2. Additionally, grooves may be undercut in a downwardly facing surface 52 of inner portion 38 to eliminate the possibility of flow stoppage in the event spacer 42 urges upper member 44 tightly against inner portion 38 of valve body 10.

Another advantage provided by the free-floating character of washer 50 is minimized wear. Washer 50 provides a portion of the flow control together with action of upper member 44. Washer 50 is recommended for use on all valves having an upper pin of the type represented by member 44 in the drawings.

In alternate embodiments of this invention, the valve elements, valve seat and spacer member are constructed with geometry so that the valve element edges which rest on the valve seat are free-floating and not contacted by the spacer. It has been found that this free-floating character of the edges of the valve element, which edges are designated generally 52 in the drawings, contributes to the sealing achieved at the valve seat thereby preventing valve leakage. This phenomenon is believed attributable to the freedom of the pliable, elastomeric material of the valve element in the area the valve element contacts the seat being free to flow, on a microscopic basis, to fill all the nooks, crannies and crevices which are present at the annular valve seat, thereby forming a good, water-tight seal at the seat.

In the preferred embodiment of the invention, the free-floating character of the surfaces of edges 52 of valve element 40 which contact valve seat 18 is supplied by having the surface of spacer 42, which is contacting valve element 40, finished in a way that valve element 40 slides freely along spacer 42 while remaining in facing contact therewith. It has been found that when spacer 42 is brass, a sufficiently porous and sufficiently slippery character of the surface of spacer 42 facing valve element 40 is imparted by tumbling spacer 42 in a sand or other abrasive environment in a manner to "break corners", as that term is used in the machining trade, and thereafter blasting the facing surface of spacer 42 using aluminum oxide entrained in an impinging air stream. The resultant slipperiness of spacer 42 vis-a-vis valve element 40 and the weight of spacer 42 bearing upon valve element 40, where it lies on seat 18, produces a good, water-tight seal which repeatedly seals when the valve element 40 lies on seat 18.

Further referring to the drawings and particularly FIG. 8, the interior of valve body 10 in the region of spacer 42, where spacer 42 moves vertically when valve operating element 28 is actuated, includes vertically oriented ribs 54 positioned around the annular interior of valve body 10. Ribs 54 are provided to space valve element 40 slightly away from the interior wall 56 of valve body 10. This is desirable because when valve element 40 is the preferred silicone rubber material, valve element 40 will absorb some impurities or non-water elements, for example syrup or medication, which may be put in the water. Upon such absorption, valve element 40 expands slightly. Ribs 54 prevent valve element 40 from wedging in place against interior wall 56 of valve body 10; valve element 40 can still move between open and closed positions of the valve while in contact with ribs 54 because the frictional force therebetween is sufficiently small that such frictional force may be overcome by an animal moving valve operating member 28. In this respect, the flat shape of valve element 40, in the preferred embodiment of the invention, has been found to minimize problems associated with the silicone rubber absorbing water-laden impurities, syrup, medication and the like.

Second portion 24 of downstream part 20 acts as a cavity, holding the last drop of water to pass through the valve before valve element 40 closes against valve seat 18. This cavity retains the last drop of water and imparts improved performance characteristics, vis-a-vis the prior art apparatus to the valve.

Figure 9:
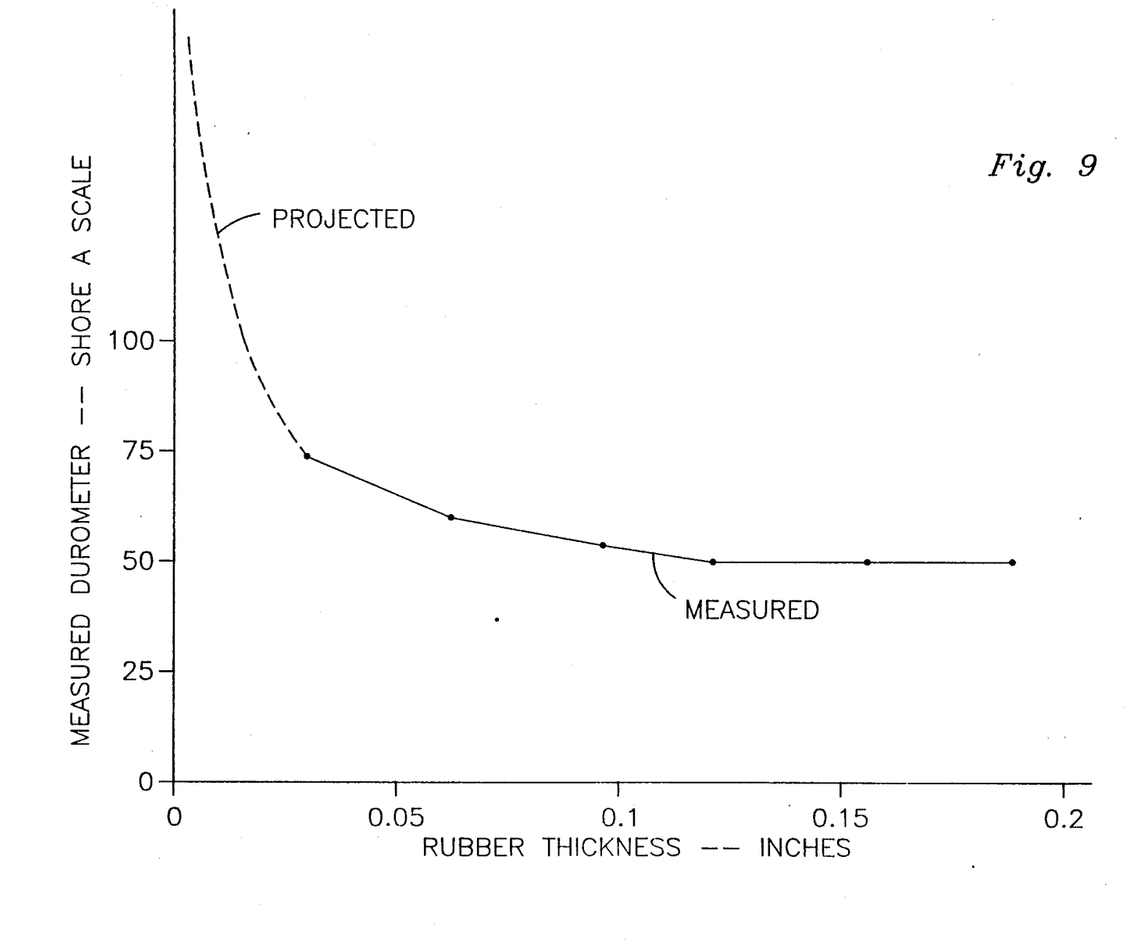
FIG. 9 is a graph of effective durometer versus thickness for silicone rubber material preferably used as the valve element in apparatus manifesting the invention.

The importance of providing effectively free-floating construction for edges 52 of valve element 40 in the alternative embodiments of the invention is demonstrated by FIG. 9. FIG. 9 is a plot of effective durometer versus thickness of silicone rubber where the durometer of the silicone rubber is measured on the Shore A scale, the commonly used scale for measuring rubber durometer. The data depicted in FIG. 9 were developed by measuring durometer of rubber of various thicknesses where the rubber was placed on a hard, surface. Note that the measured durometer drops as thickness of the rubber increases. This is attributable to the fact that when the rubber is relatively thin, the durometer measurement is affected by the surface on which the rubber rests. Applicant has discovered this phenomenon and has found that where edges 52 of valve element 40 are in contact with a spacer element 42 and the surface of spacer element 42 facing the edges 52 of valve element 40 has not been prepared or configured so that the valve element edges may move freely relative to the spacer and the valve element is relatively thin, the phenomenon illustrated in FIG. 9 prevents the edge structure 52 from deforming sufficiently at the valve seat 18 to provide a water-tight seal.

Further respecting the phenomenon illustrated in FIG. 9, applicant calls this phenomenon "feel through", to indicate durometer measurements of elastomeric materials which are flush with hard, planar surfaces and thereby inhibited from flowing parallel to those surfaces in a manner which, in the application of the invention, would create a water-tight seal at the valve annular seat. Applicant is unaware of any publication heretofore in the scientific literature of this "feel through" phenomenon, much less any practical application of this phenomenon in the valve art.

So long as the "feel through" effect is avoided at the edge of the valve element, the construction at the center of the valve element is unimportant. The stippling produced by the preferred sandblasting or blasting with aluminum oxide of the cylindrical spacer 42 in the preferred brass in the preferred embodiment of the invention produces the same free-floating effect of valve element 40 across the entire surface of spacer 42. However, this is not necessary; it is a by-product ancillary to and a result of the sandblasting.

Figure 4:
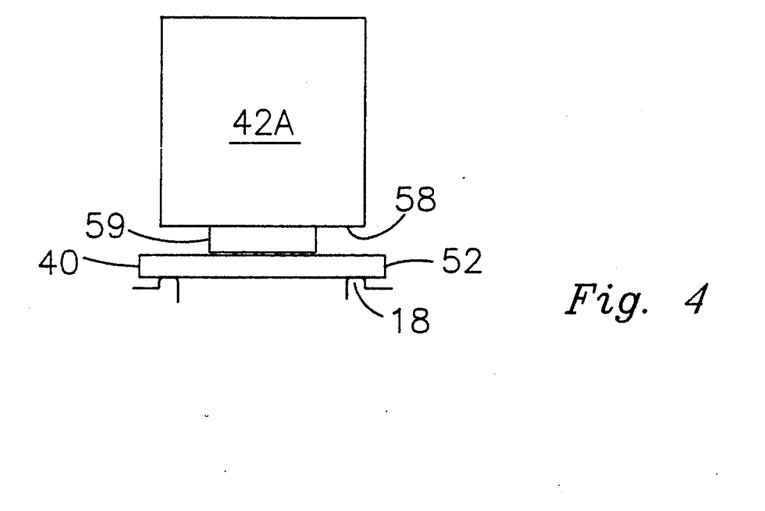
FIG. 4 is a side elevation view of an alternate embodiment of a portion of the internal valve element structure of the device illustrated generally in FIG. 1.
Figure 5:
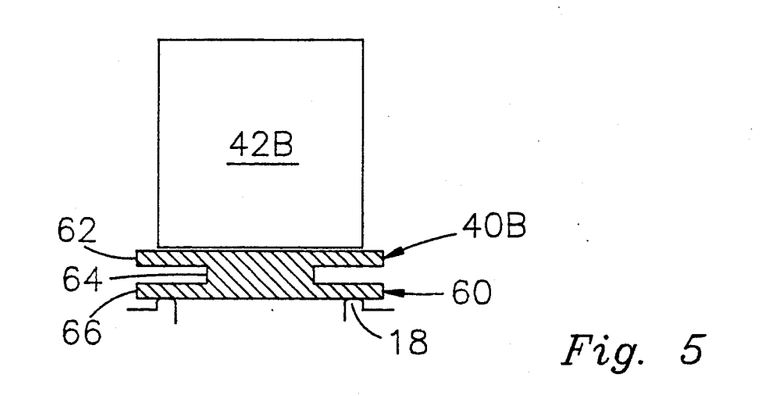
FIG. 5 is a side elevation view of a second alternate embodiment of a portion of the internal valve element structure of the device illustrated generally in FIG. 1.
Figure 6:
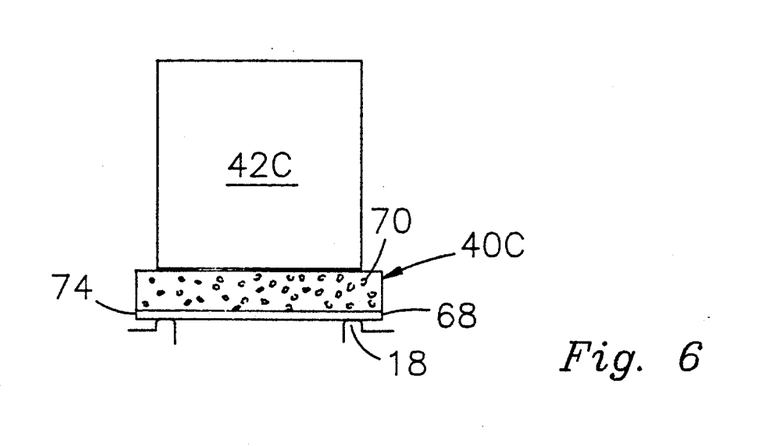
FIG. 6 is a side elevation view of a third alternate embodiment of a portion of the internal valve element structure of the animal watering device illustrated generally in FIG. 1.

The apparatus depicted in FIGS. 4, 5 and 6 addresses this free-floating phenomenon.

In FIG. 4, the spacer, designated 42A, has been cut-away so as to provide shoulders 58 spaced away from edges 52 of valve element 40. As a result, edges 52 are freely deformable and can deform adequately so that when contacting the valve annular seat 18, sufficient deformation occurs that a good, water-tight seal is achieved.

FIG. 5 illustrates another structure designed to achieve water-tight sealing in light of the phenomenon illustrated in FIG. 9. In FIG. 5, the valve element has been generally designated 40B and includes a first elastomeric disk 60 extending across and contacting valve annular seat 18, a second elastomeric disk 62 which is parallel with disk 60 and spaced therefrom and a connecting means 64 which connects disks 60 and 62 and retains them in spaced disposition respecting one another with the disks separated by the axial length of means 64. As is readily apparent from FIG. 5, the edges of elastomeric disk 60, which are designated 66 in FIG. 5, are freely movable since they are separated from spacer 42 by an inner gap having thickness the same as axial length of connecting portion 64.

Referring to FIG. 6, the valve element designated generally 40C has been depicted in section as including a thin elastomeric disk 68 and a sponge-like material 70 covered with a flexible skin 72. Sponge material 70 is sufficiently compressible and flexible that it effectively mechanically isolates edge portions 74 of disk 68 from spacer 42C thereby permitting edges 74 to move freely, to deform in the radial direction respecting the passageway through the valve and thereby affect a water-tight seal at annular valve seat 18.

It is further to be understood that it is desirable for each embodiment of the invention that the effective durometer of the valve element, at the edges of the valve element contacting the annular valve seat, be lower than 50, preferably about 40.

Also, the invention may be practiced utilizing an upper movable member 44 having only a shaft or stem portion 48 with no head portion 46. In such case, the shaft or stem portion may be dropped into place as the valve is installed on the water supply member 34. Similarly, the invention may be practiced utilizing no spacer 42 and no upper movable member 44. In such case, the inner portion 38 of valve body 10 is extended downwardly, when considering FIG. 1, to a position sufficiently proximate valve element 40 that valve element 40 cannot flip over or rotate sufficiently to assume a disposition at which it is essentially aligned with the axis of the passageway.

Further considering the configuration illustrated in FIG. 4, the cylindrical spacer 59 protruding from larger spacer 42A could be molded in place as a part of valve element 40, protruding towards spacer 42A.

It is further to be understood that the valves to which the invention is directed are for low pressure, low flow rate applications.

In the preferred embodiment of the invention, valve element 40 is 0.031 inch thick silicone rubber having an outer diameter of 0.325 inches. Spacer 42 is cylindrical 11/32 inch bar stock. The inner diameter of the valve body in the region where spacer 42 resides is 0.398 inches while the inner diameter measured at ribs 54 is 0.368 inches.

Ideally, surface 51 of inner portion of valve body 10 is equipped with undercuts so that even if spacer 42 pushes upper movable member 44 upwardly and against valve body portion 38, flow will not be entirely blocked. This is because it is desirable to have some flow communication between water supply member 44 and valve element 40 to provide some small positive pressure at valve element 40 and valve annular seat 18.

I claim the following:

1. In an animal operated watering device, the combination of:
   a. a valve body including a passageway therethrough having an inlet and an outlet, adapted to be secured to a hollow water supply member with said inlet communicating with the water supply member and said passageway extending vertically;
      i. an intermediate portion of said valve body defining a transverse annular valve seat in said passageway, facing said inlet;
      ii. a portion of said valve body between said seat and said outlet defining a first portion of said passageway adjacent said seat and a second portion of said passageway extending from said first portion towards said outlet, said first and second passage portions joining at a transverse annular collar;
   b. a movable valve operating member having a head resting on said collar and extending substantially the length of said first passage portion and a stem extending through said second passage portion and projecting beyond said outlet end;
      i. axial dimension of said head not exceeding axial length of said first passage portion and transverse dimension of said head being smaller than that of said first passage portion, there being an annular space between said operating member and a surrounding wall defining said passageway through which water can flow when said head of said operating member is displaced from said collar;
      ii. outer diameter of said stem being sufficiently less than inner diameter of said collar so that when said stem is displaced at an angle to the vertical, said head can tilt so that a head edge rises above said seat;
   c. a freely movable valve element in said passageway adjacent said seat, extending completely across an opening defined by said seat;
   d. a spacer member lying on said valve element and extending upwardly in a portion of said passageway between said valve element and said inlet;
      i. a surface portion of said spacer contacting said valve element being sufficiently porous to prevent ringing of said spacer member and said valve element when in contact one with another such that said valve element does not stick to said surface but slides along said surface when said valve operating member head tilts and lifts one side of said valve element off said seat;
   e. a portion of said passageway proximate said inlet defining a tubular restriction passageway;
      i. said inlet of said passageway being axially aligned with the opening defined by said seat;
   f. the exterior of said valve body surrounding said inlet being generally transverse to said passageway;
   g. a movable member in said passageway between said spacer and said inlet, head contacting a surface of said spacer opposite the surface of said spacer contacting said valve element, and a stem projecting through the restriction passageway and the inlet of said passageway, there being clearance between the stem of the movable member and the tubular restriction passageway;
   h. a free floating washer surrounding the stem portion of said movable member exterior of said passageway and being generally flush with said exterior portion of said valve body surrounding said inlet;
      i. there being a very small clearance between said stem of said movable member and the inner surface of said washer.

2. Apparatus of claim 1 wherein said valve element is an a homogeneous body of elastomeric material.

3. Apparatus of claim 2 wherein said elastomeric material is silicon rubber.

4. Apparatus of claim 3 wherein said silicon rubber is less than about 50 durometer.

5. Apparatus of claim 1 wherein said spacer is a cylindrical member and said surface of said cylindrical member contacting said valve element disk is prepared by tumbling said cylindrical member to break corners and thereafter blasting with aluminum oxide.

6. Apparatus of claim 5 wherein said spacer is brass.

7. Apparatus of claim 5 wherein said cylindrical member diameter is greater than that of said valve element.

8. Apparatus of claim 5 wherein said cylindrical member diameter is greater than that of said seat.

9. Apparatus of claim 1 wherein said stem of said movable member stem and said washer are the same material.

10. In an animal operated watering device, the combination of:
   a. a valve body having an axial passageway with inlet and outlet ends, adapted to be secured to a water supply member with said inlet communicating with the interior of the water supply member and said passageway extending vertically;
      1. an intermediate portion of said valve body defining a transverse annular valve seat in said passageway, facing towards said inlet;
      ii. a portion of said valve body between said seat and said outlet defining a first portion of said passageway adjacent said seat and a second portion of said passageway extending from said first portion towards said outlet, said first and second portions joining at a transverse annular collar;
   b. a movable valve operating member having:
      1. a head resting on said collar and extending longitudinally substantially the length of said first portion; and
      ii. a stem extending through said second portion and projecting beyond said outlet;
      iii. axial dimension of said head not exceeding axial length of said first portion and transverse dimension of said head being smaller than that of said first portion, there being an annular space between said operating member and a surrounding wall defining said passageway through which water can flow when said head of said operating member is displaced from said collar;
      iv. outer diameter of said stem being sufficiently less than inner diameter of said collar so that when said stem is displaced at an angle to the vertical, said head can tilt so that a head portion edge rises above said seat;
   c. a freely movable valve element in said passageway, contacting and extending completely across an opening defined by said seat, a portion of said valve element contacting said seat being elastomeric;
   d. a freely movable spacer lying on said valve element and extending upwardly in a portion of said passageway between said valve element and said inlet, said spacer being sufficiently removed from said valve element that said valve element contacts said seat that feel-through of said spacer respecting the elastomeric portion of said valve element contacting said seat is avoided, with contacting surfaces of said spacer and said valve element being sufficiently porous to prevent ringing adherence of said spacer and said valve element.

11. Apparatus of claim 10 wherein said valve element is a homogeneous elastomeric disk and said spacer is cylindrical and has a shoulder removed from said valve element proximate a periphery portion of said disk to a diameter less than diameter of said seat.

12. Apparatus of claim 11 wherein said elastomer is silicon rubber.

13. Apparatus of claim 12 wherein said silicon rubber is about 50 durometer or lower.

14. Apparatus of claim 11 wherein said means connecting said first and second disks is integrally molded with said first and second disks to define a homogeneous member.

15. Apparatus of claim 10 wherein said valve element comprises:
   a. a first elastomeric disk extending across and contacting said seat;
   b. a second disk parallel with said first disk and spaced therefrom; and
   c. means connecting said first and second and retaining said first and second disks in spaced disposition respecting one another.

16. Apparatus of claim 15 wherein said elastomer is silicon rubber.

17. Apparatus of claim 16 wherein said silicon rubber is about 50 durometer or lower.

18. Apparatus of claim 10 wherein said valve element comprises:
   a. an elastomeric disk extending across and contacting said seat; and
   b. a buffer member, extending from said elastomeric disk towards said cylindrical member for contact therewith, said buffer member being of material more compressible than the material of said elastomeric disk.

19. Apparatus of claim 18 wherein said buffer material is foam and said buffer disk is covered with a flexible skin.

20. Apparatus of claim 19 wherein said buffer member has a disk-like configuration.

21. In an animal operated watering device, the combination of:
   a. a valve body having a passageway with inlet and outlet ends, adapted to be secured to a hollow water supply member with said inlet communicating with the interior of the water supply member and said passageway extending vertically, an intermediate portion of said valve body defining a transverse annular valve seat in said passageway, facing towards said inlet;
   b. a valve operating member projecting beyond said outlet end;
   c. a movable valve element in said passageway, extending across an opening defined by said seat;
   d. an exterior surface of said valve body surrounding said inlet end being generally transverse to said passage;
   e. a member located in said passageway between said seat and said inlet bearing on said valve element and overlying at least a portion of said annular seat;
   f. means for restricting water flow into said inlet, surrounding the portion of said stem extending out of said passageway.

22. Apparatus of claim 21 wherein said water flow restricting means comprises a free floating washer surrounding a stem portion of said member in said passageway between said seat and said inlet, said stem projecting out of the inlet end of said passageway, said washer surrounding said stem exterior of said passageway and being movable into position generally flush with an exterior portion of said valve body means surrounding said inlet, there being a very small clearance between said stem and the inner surface of said member.

23. Apparatus of claim 22 wherein said movable member stem and said free floating washer are the same material.

24. Apparatus of claim 22 wherein said movable member stem and said free floating washer are both stainless steel.

25. In an animal operated watering device, the combination of:
   a. a valve body including a passageway therethrough having an inlet and an outlet, adapted to be secured to a hollow water supply member with said inlet communicating with the water supply member and said passageway extending vertically;
      i. an intermediate portion of said valve body defining a transverse annular valve seat in said passageway, facing said inlet;
      ii. a portion of said valve body between said seat and said outlet defining a first portion of said passageway adjacent said seat and a second portion of said passageway extending from said first portion towards said outlet, said first and second passage portions joining at a transverse annular collar;
   b. a movable valve operating member having a head resting on said collar and extending substantially the length of said first passage portion and a stem extending through said second passage portion and projecting beyond said outlet end;
      i. axial dimension of said head not exceeding axial length of said first passage portion and transverse dimension of said head being smaller than that of said first passage portion, there being an annular space between said operating member and a surrounding wall of said valve body defining said passageway through which water can flow when said head of said operating member is displaced from said collar;
      ii. outer diameter of said stem being sufficiently less than inner diameter of said collar so that when said stem is displaced at an angle to the vertical, said head can tilt so that a head edge rises above said seat;
   c. a freely movable valve element in said passageway adjacent said seat, extending completely across an opening defined by said seat;
   d. means intermediate said valve seat and said inlet being sufficiently close to said valve element to contact said valve element and limit said valve element to rotating about a transverse axis of said valve body less than a 90 degrees in response to said valve opening member, said means when axially projected overlying said annular seat.

26. An animal-operated watering device, comprising:
   a. a valve body having
      i. a passageway with inlet and outlet ends, said inlet adapted to communicate with a water supply member, and
      ii. an annular seat facing said inlet at an intermediate portion of said passageway;
   b. a freely movable valve element extending across an opening defined by said seat;
   c. means in said passageway, bearing on said element and overlying at least a portion of said annular seat, for urging said element against said seat to close said passageway;
   d. means for displacing said element from said seat and opening said valve upon a portion of said operating means projecting beyond said outlet end being laterally tilted;
   e. a valve element portion contacting said seat being sufficiently elastomeric to flow at said seat to effectuate a substantially water-tight seal at said seat responsively to said urging member bearing on said valve element, when said displacing means is inoperative.

27. The device of claim 26 wherein said urging means contacts said valve element proximate a longitudinal axis of said passageway.

28. The device of claim 27 wherein said valve element is homogeneous.

* * * * *